United States Patent
Smith

(10) Patent No.: US 12,351,398 B2
(45) Date of Patent: Jul. 8, 2025

(54) CONVEYOR MODULE AND METHOD OF MANUFACTURING

(71) Applicant: Safari Belting Systems, Inc., Olathe, KS (US)

(72) Inventor: Christopher J. Smith, Leawood, KS (US)

( * ) Notice: Subject to any disclaimer, the term of this patent is extended or adjusted under 35 U.S.C. 154(b) by 235 days.

(21) Appl. No.: 18/219,981

(22) Filed: Jul. 10, 2023

(65) Prior Publication Data

US 2024/0010440 A1    Jan. 11, 2024

Related U.S. Application Data

(60) Provisional application No. 63/359,504, filed on Jul. 8, 2022.

(51) Int. Cl.
*B65G 39/20* (2006.01)
*B65G 17/32* (2006.01)

(52) U.S. Cl.
CPC ............. *B65G 39/20* (2013.01); *B65G 17/32* (2013.01)

(58) Field of Classification Search
None
See application file for complete search history.

(56) References Cited

U.S. PATENT DOCUMENTS

| | | | |
|---|---|---|---|
| 6,997,306 B2 | 2/2006 | Sofranec et al. | |
| 7,364,038 B2 * | 4/2008 | Damkjaer | B65G 17/32 198/853 |
| 8,496,105 B2 | 7/2013 | MacLachlan et al. | |
| 8,881,890 B2 | 11/2014 | MacLachlan et al. | |
| 10,549,917 B2 * | 2/2020 | Garehan | B65G 13/10 |
| 10,773,896 B1 | 9/2020 | Smith | |
| 2015/0175357 A1 | 6/2015 | Wolff et al. | |

FOREIGN PATENT DOCUMENTS

| | | |
|---|---|---|
| CN | 205221781 U | 5/2016 |
| CN | 209739962 U | 12/2019 |
| EP | 3909889 A1 | 11/2021 |

* cited by examiner

*Primary Examiner* — Kavel Singh
(74) *Attorney, Agent, or Firm* — John G. Fischer, Esq.; Scheef & Stone, L.L.P.

(57) ABSTRACT

A conveyor module is disclosed. The module is formed around one or more cup assemblies. The cup assembly comprises a cup having a top formed flush with the top surface of the module, and a bottom formed flush with the bottom surface of the module. The cup has a hollow interior and a pair of opposing sockets positioned in the interior. An axle extends between the sockets. A roller is mounted on the axle and extends above the top surface of the module, and may also extend below the bottom surface of the module. The cup assembly comprises a cup having a top having a top perimeter, and a bottom having a bottom perimeter. A centerline of the cup has a middle perimeter. The top perimeter and the bottom perimeter are shorter than the middle perimeter.

24 Claims, 20 Drawing Sheets

CONVEYOR MODULE AND METHOD OF MANUFACTURING

TECHNICAL FIELD OF INVENTION

The invention relates generally to a conveyor system, including retail product conveyor systems and for use in package handling, processing, distribution, and sorting. The invention further relates to a method of manufacturing the unique elements of the invention that includes over-molding a preassembled cup assembly in a conveyor module.

BACKGROUND OF THE INVENTION

In the retail shipping industry, as well as the meat and meat packing industries, conveyor belts and conveyor systems are commonly utilized to transport product. The most frequently employed conveyor systems comprise a number of interlocking conveyor modules linked together to form a continuous conveyor belt, which is driven by a sprocket. It is common to have rotatable rollers mounted on axles that are mounted on the conveyor modules.

Some such systems include rollers mounted on axles that are installed on ledges formed in the conveyor module. The axle and, thus, the roller are then held in place by means of a retaining cap. The cap is then adhered by a secondary process of ultrasonic welding, epoxy or solvent-bonding, or threading where a ball roller is used. An example of such designs is found in U.S. Pat. No. 6,997,306. These designs suffer the disadvantages of the time, expense, and reliability of the secondary process. Additionally, these designs do not readily permit replacement of directional rollers.

Other systems have been designed to use an over-molding process in which the axle is molded from a first polymer into a shape having position and alignment features. After placing the axle in a first half of the injection mold, a second module mold half closes and seals the injection mold. A thermoplastic material is then injected between the molds around the axle ends. A two-part roller is then assembled over the axle that is fixed in the mold. One such example of such a conveyor is U.S. Pat. No. 8,881,890. While relatively easy to over-mold, these designs suffer the disadvantages of having a complex roller attachment required after molding. They have the further disadvantage that the two-part roller may have surface and axle tube discontinuities that are subject to premature failure as compared to conventional solid rollers.

Other systems have been designed to permit replacement of directional rollers on such conveyers. One such example of such a conveyor that also permits revised roller orientation is U.S. Pat. No. 10,773,896. These devices, however, require mold geometries that are difficult to manufacture in a manner that sufficiently retains the cup in high-impact force environments. A further disadvantage is that post-molding roller attachments necessarily have complex geometry interfaces that can trap contaminants.

Therefore, there is a need for a conveyor system that addresses at least some of the problems associated with the conventional systems. In particular, a conveyor system is needed that is easy to manufacture and durable.

SUMMARY OF THE INVENTION

Advantages of the various embodiments of the present invention are that it is durable. Another advantage of the present invention is that it is inexpensive to manufacture. Another advantage of the present invention is that it does not require a post molding assembly. Other advantages of the various embodiments of the present invention are that they do not require post molding, welding, gluing or other methods of affixing component parts to a molded conveyor module. Another advantage of the present invention is that it provides homogeneous module surfaces that do not trap contaminants.

Another advantage of the present invention is that it provides a unified cup-in-module combination that is resistant to vertical dislodgement in a high-impact environment. Another advantage of the present invention is that it provides for a unified cup-in-module combination that is resistant to angular dislodgement in a high-impact environment. Another advantage of the present invention is that it provides a means of presetting the angular orientation of the cup assembly in the conveyor module with visual alignment indicators.

Another advantage of the present invention is that it provides a strengthened cup structure that can withstand the molding process and vibration in operation. Another advantage of the present invention is that it provides a unique method of manufacturing. Other advantages of the various embodiments of the present invention are that it is easy to clean.

In accordance with a preferred embodiment of the present invention, a conveyor module is provided. The module is pivotally securable to adjacent modules on either side.

In one embodiment, the conveyor module comprises a planar member having a first edge, an opposing second edge, a top surface, and a bottom surface. A plurality of first links is located along the first edge. A plurality of second links is located along the second edge, and offset from the first links. The conveyor module is formed around one or more cup assemblies. The cup assembly comprises a cup having a top formed flush with the top surface of the conveyor module, and a bottom formed flush with the bottom surface of the conveyor module. The cup has a hollow interior and a pair of opposing sockets positioned in the interior. An axle extends between the sockets. A roller is mounted on the axle and extends above the top surface of the conveyor module.

In another embodiment, the roller extends below the bottom surface of the conveyor module. In another embodiment, the top has a top perimeter and the bottom has a bottom perimeter. A cup centerline extends across the cup halfway between the top and the bottom of the cup. A middle perimeter surrounds the exterior of the cup at its centerline. The top perimeter and the bottom perimeter are shorter than the middle perimeter, thus providing an enlarged portion of the cup between the top and the bottom.

In another embodiment, a pair of parallel opposing axle walls are located on the interior of the cup. The opposing sockets are located in the opposing axle walls. In another embodiment, ribs are formed on the exterior of the cup. Reliefs are formed between adjacent ribs.

In another embodiment, the ribs extend between the cup top and the cup bottom. In another embodiment, the ribs surround the cup exterior. In another embodiment, each rib is formed at an arc angle a about the exterior and the ribs are separated by reliefs also formed at an arc angle a about the exterior.

In another embodiment, the arc angle a is fifteen-degrees (15°). In another embodiment, the cup has a plurality of ribs, with each rib formed at an arc angle a about the exterior of the cup. A relief is provided adjacent to each rib. A panel is positioned between the reliefs. The panel is formed at an arc angle b about the exterior of the cup that is wider than arc angle a.

In another embodiment, the cup exterior has a plurality of ribs and four panels. In another embodiment, the cup exterior has a first pair of panels separated by alternating ribs and reliefs to form an arc angle of ninety degrees (90°) on the exterior of the cup. A second pair of panels are separated by alternating ribs and reliefs to form an arc angle of ninety degrees (90°). The second pair of panels are disposed at one hundred eighty degrees (180°) opposite the first pair of panels.

In another embodiment, the cup has a hollow interior with a pair of opposing axle walls. A pair of opposing path walls are located in perpendicular relation to the axle walls. Transitions connect the axle walls to the path walls.

In another embodiment, the cup has a plurality of ribs, and a relief formed adjacent to each of the ribs. A panel is positioned between two reliefs and proximate to the junction of the path walls and transitions.

In another embodiment, the cup has an exterior shape of a segmented spheroidal. In another embodiment, the cup has an exterior shape of an oblate spheroidal.

In another embodiment, the cup has a cup midplane parallel to, and halfway between, the top and the bottom of the cup. A cup diameter is located at the cup midplane representing an exterior diameter of the cup. A top diameter represents an exterior diameter of the top of the cup. A bottom diameter represents an exterior diameter of the bottom of the cup. The top diameter and the bottom diameter are equal to each other, and the top diameter and the bottom diameter are less than the cup diameter.

In another embodiment, the sockets, axle, and roller are centered on the cup diameter. In another embodiment, the sockets, axle, and roller are centered above the cup diameter.

In another embodiment, a cup midplane is parallel to, and halfway between, the top and the bottom of the cup. The sockets, axle, and roller are located above the cup midplane.

In another embodiment, the cup has a conveyor module direction being perpendicular to the first edge of the planar member, and a roller direction that is perpendicular to the axle.

In another embodiment, a method of manufacturing the embodiments described above is provided. In one embodiment, the method of manufacturing a conveyor belt module comprises the process steps of:
1. molding a cup having a hollow interior, a pair of opposing sockets in the interior, a flat top surface and a flat bottom surface in a plane parallel to the top surface;
2. placing a roller with a hollow center axis in the interior of the cup;
3. locating an axle in the sockets of the cup and in the central axis of the roller to create a cup assembly;
4. providing a first mold having a first receptacle;
5. providing a first insert having a fill structure that extends in complementary fit into a gap between the roller and the interior of the cup, and a base, locatable against the top of the cup assembly and insertable into the first receptacle;
6. positioning the first insert in the first receptacle of the first mold and connecting both to an injection molding machine;
7. providing a second mold having a second receptacle;
8. providing a second insert having a fill structure that extends in complementary fit into a gap between the roller and the interior of the cup and a base, locatable against the bottom of the cup assembly and insertable into the second receptacle;
9. positioning the second insert in the second receptacle of the second mold and connecting both to an injection molding machine;
10. positioning the cup assembly over the fill structure of the first insert;
11. pressing the second mold against the first mold to form a conveyor module void between the first mold and the second mold;
12. infusing the conveyor module void with a desired polymer;
13. curing the polymer to form a conveyor module section with the cup assembly in the desired location and orientation;
14. removing the second mold from the proximity of the first mold; and,
15. removing the conveyor module and cup assembly from the molding machine.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

FIGS. 1-4 illustrate various views of a cup element 10 shown in an embodiment of the disclosed invention.

Figure 1:
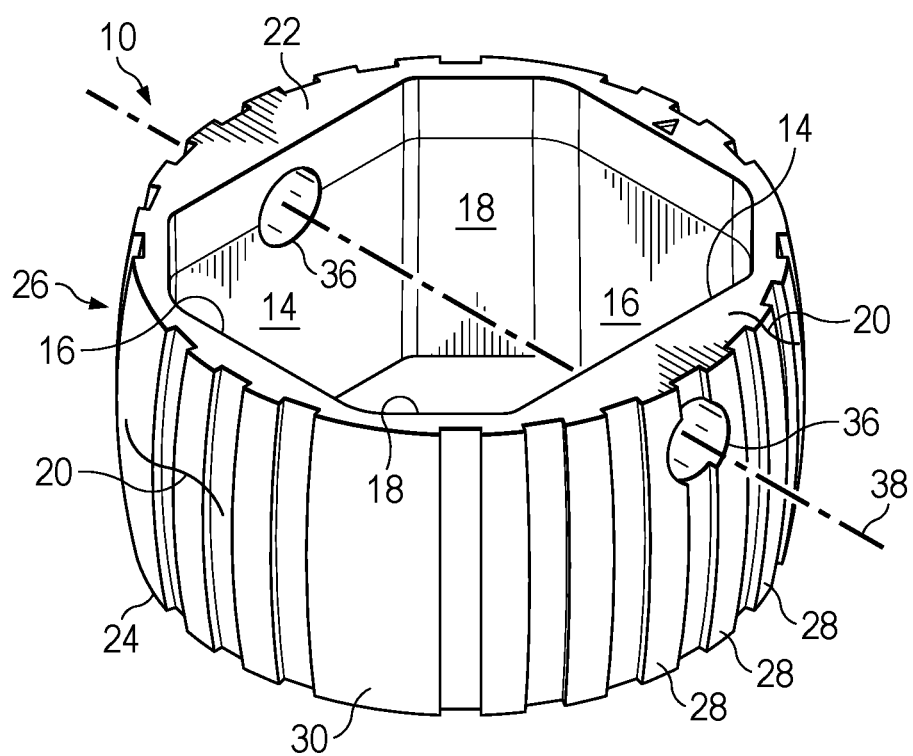
FIG. 1 is an isometric view of an embodiment of a cup element of the disclosed invention.
Figure 2:
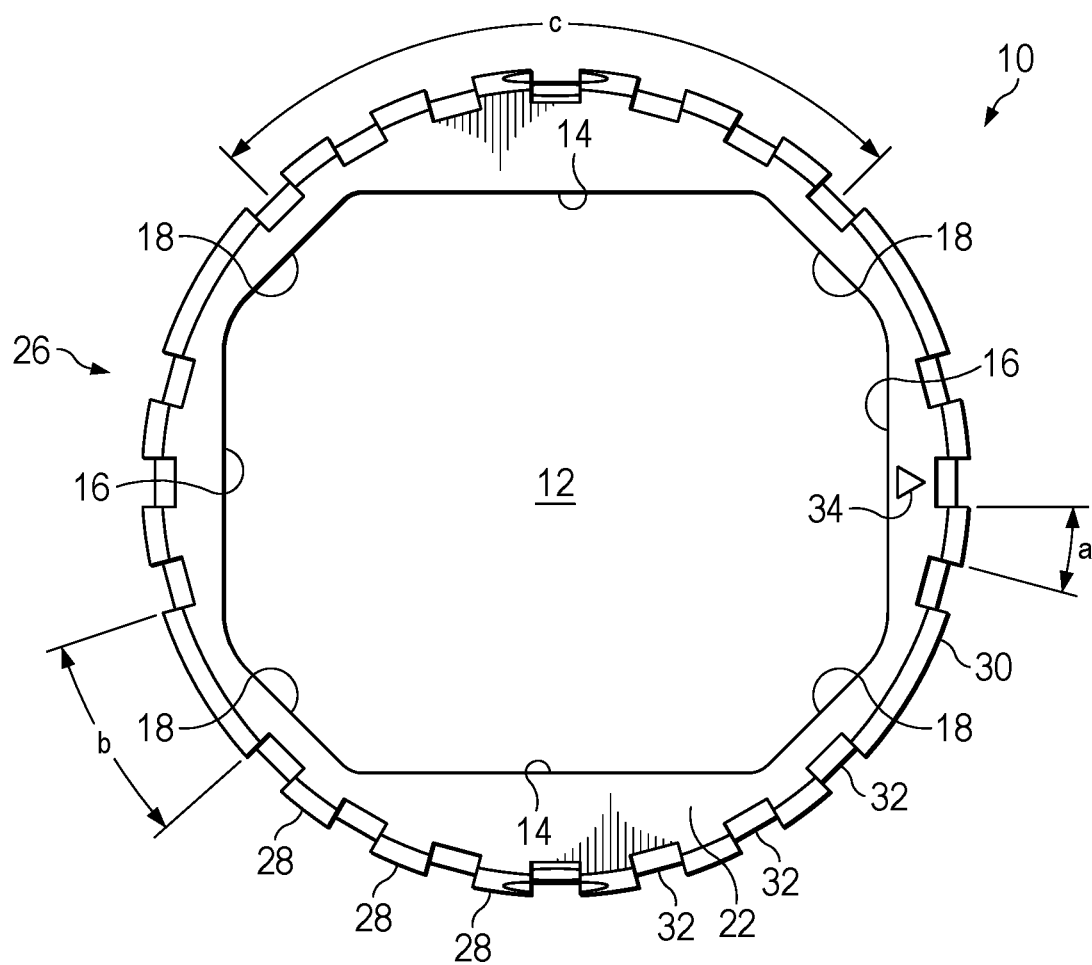
FIG. 2 is a top view of the cup of FIG. 1.

FIG. 1 is an isometric view of an embodiment of a cup element of the disclosed invention. FIG. 2 is a top view of cup 10 of FIG. 1. Referring to FIG. 2, cup 10 has a hollow interior 12. In the embodiment illustrated, interior 12 is defined by a pair of opposing axle walls 14. A pair of opposing path walls 16 are located in perpendicular relation to axle walls 14. Transitions 18 connect the axle walls 14 to the path walls 16.

Figure 3:
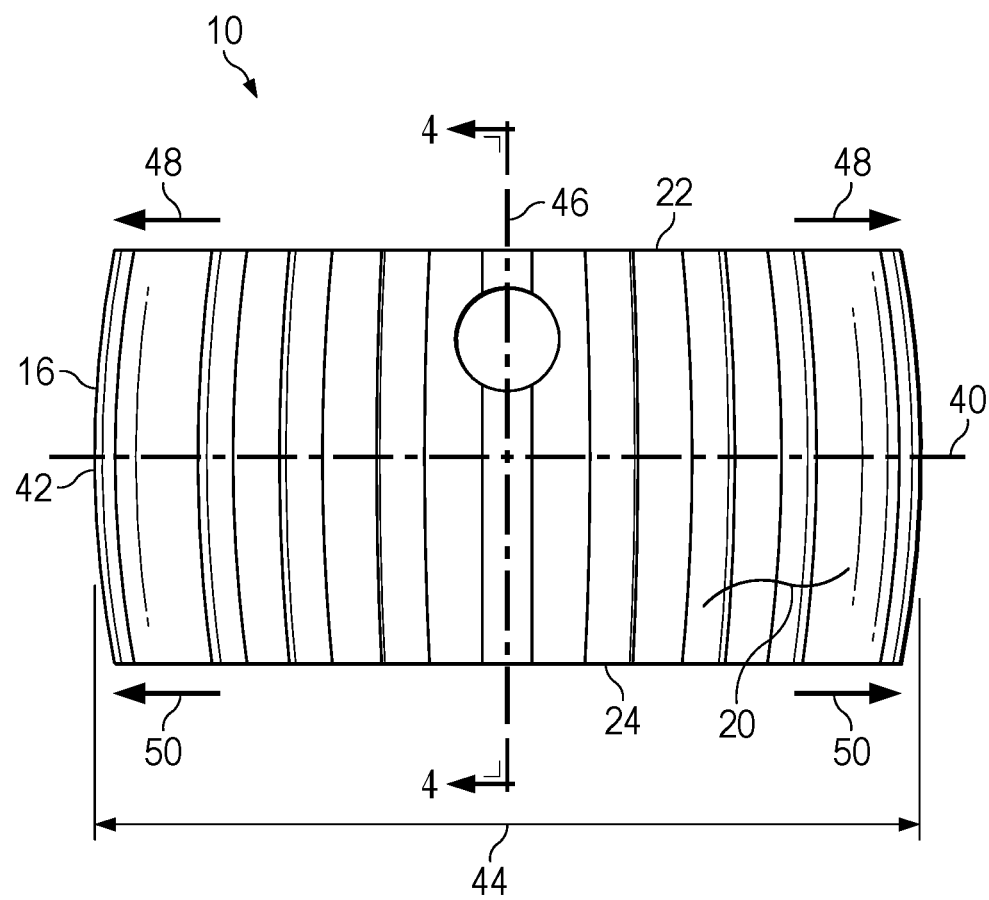
FIG. 3 is a side view of the cup of FIGS. 1-2.

Referring back to FIG. 1, cup 10 has an exterior 20. Exterior 20 of cup 10 is comprised of a number of elements. Atop 22 is formed at the top of cup 10. As best seen in FIG. 3, an opposite bottom 24 is formed at the bottom of cup 10. A body portion 26 extends between top 22 and bottom 24. In one embodiment, top 22 and bottom 24 are substantially flat, and reside in parallel planes to each other. Sockets 36 extend through axle walls 14. A socket centerline 38 extends between the center of the sockets 36 (see FIG. 4).

In one embodiment, as illustrated, body 26 may be generally spherical, or spheroidal. In another embodiment, body 26 is an oblate spheroidal. These terms are employed to refer to the general overall shape of cup 10, regardless of the surface structure on body 26.

In one embodiment, exterior 20 comprises a series of ribs 28 extending between top 22 and bottom 24. Ribs 28 are separated by reliefs 32. In another embodiment, best seen in FIG. 2, one or more panels 30 are provided between reliefs 32. Panels 30 have a wider arc angle b than the arc angle a of ribs 28. Panels 30 are located proximate to the junction of path walls 16 and transitions 18. The junction of path walls 16 and transitions 18 is proximate to the corner of cylindrical roller 66 and is thus a critically narrow section of cup 10. To provide sufficient strength to body 26 of cup 10 at this juncture, panels 30 are provided to the exclusion of reliefs 32. This solves problems encountered with molding failures of cup 10 that incur, in part, when reliefs would otherwise be in the vicinity of the junction of path walls 16 and transitions 18, and further eliminates the additional stress formed at the junction of each rib 28 and relief 32 at the critically thin section.

In one embodiment, an indicator 34 is provided on top 22 of cup 10. Indicator 34 can be used to precisely align cup 10 in the mold assembly for over-molding.

As seen in FIG. 3, a midplane 40 bisects cup 10 at a location parallel to, and halfway between, top 22 and bottom 24. A cup diameter 44 is defined as the distance between opposing ribs 28 at midplane 40. Atop diameter 48 is defined as the distance between opposing ribs 28 at top 22. A bottom diameter 50 is defined as the distance between opposing ribs 28 at bottom 24.

Figure 13:
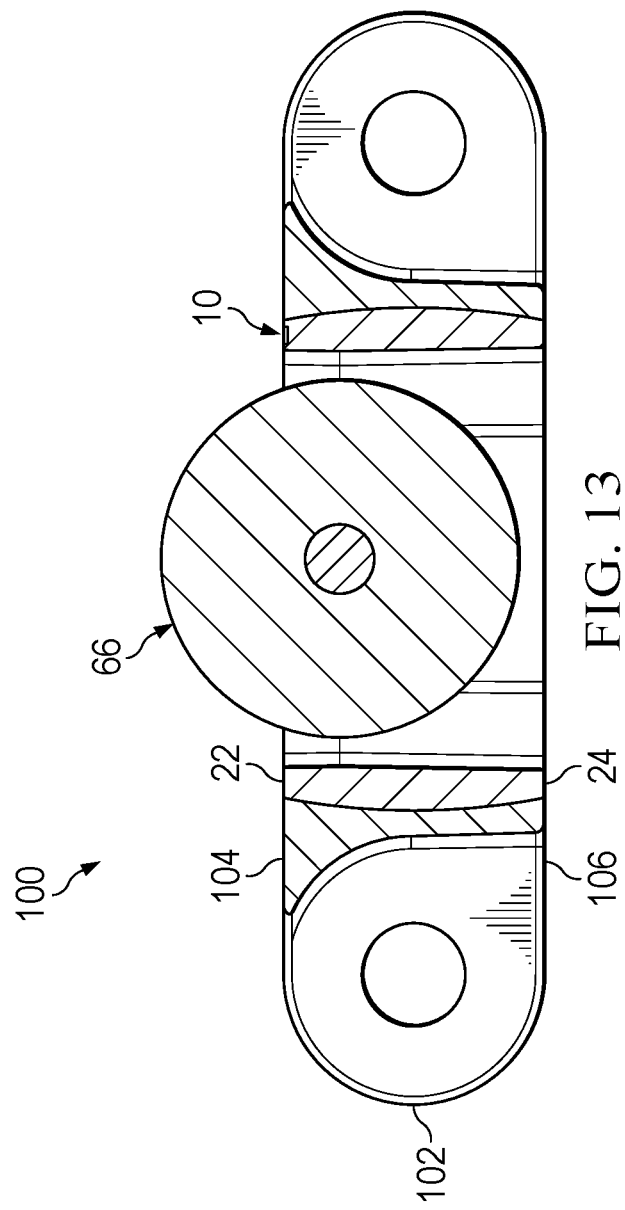
FIG. 13 is a cross-sectional end view of the conveyor module of FIGS. 10-12.

As seen in the embodiments illustrated, the enlarged center design 42 of cup 10 renders cup diameter 44 larger than top diameter 48 or bottom diameter 50. In various embodiments, cup 10 has an enlarged midsection and may be, for example, spherical or spheroidal as illustrated. As can be seen in FIG. 13, enlarged cup diameter 44 secures cup 10 within conveyor module 100 and resists displacement even in a high impact environment. In one embodiment, top diameter 48 is equal to bottom diameter 50.

Figure 4:
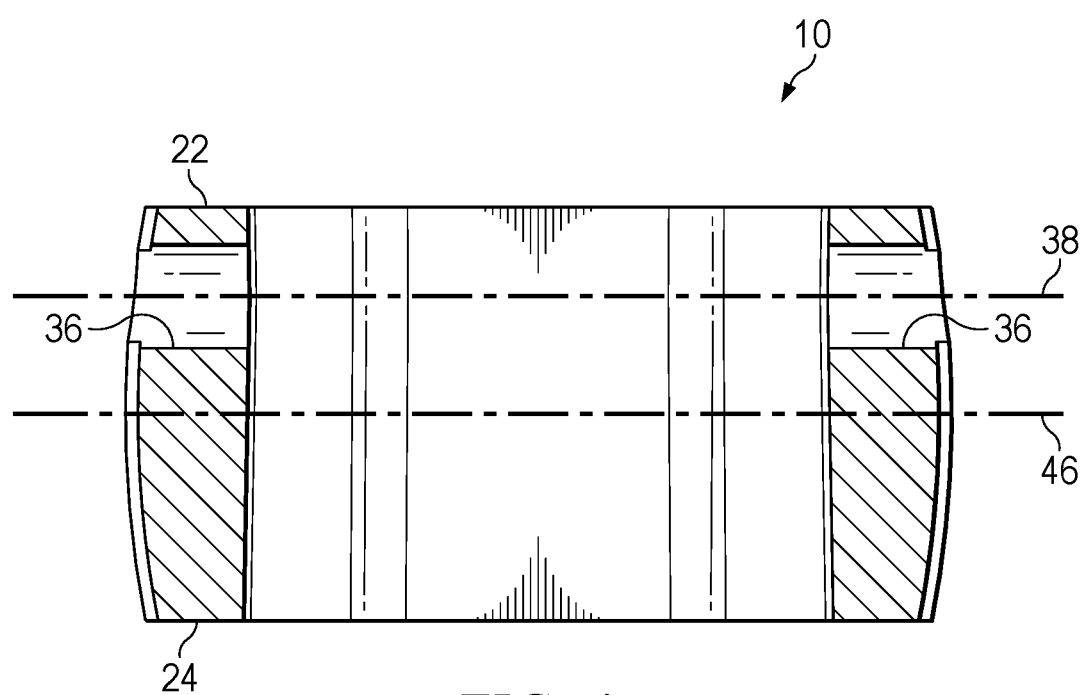
FIG. 4 is a cross-sectional side view of the cup of FIGS. 1-3.
Figure 6:
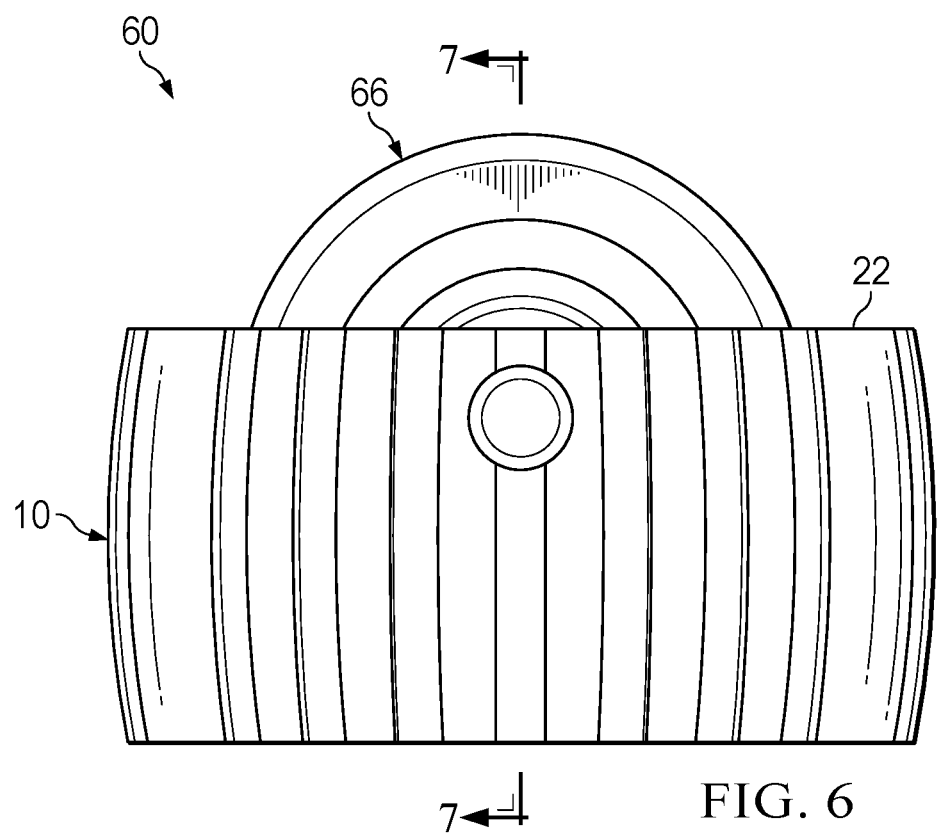
FIG. 6 is a side view of the cup assembly of FIG. 5.
Figure 14:
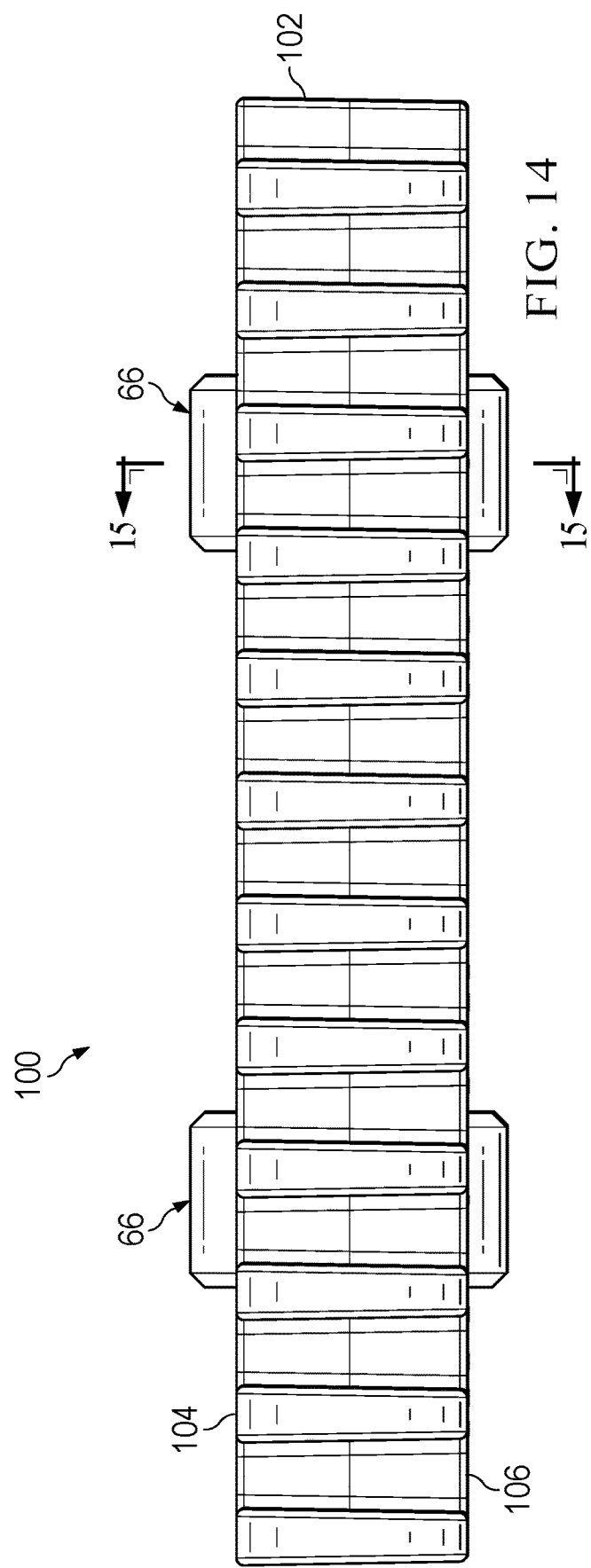
FIG. 14 is a side view of another embodiment of a conveyor module in accordance with the disclosed invention in which the rollers extend above and below the conveyor module.

FIG. 4 is a cross-sectional side view of the cup of FIGS. 1-3. As seen in FIG. 4, cup 10 has a socket centerline 38 extending between the centers of sockets 36. In the embodiment illustrated, cup 10 has a cup centerline 46 coincident with midplane 40 that is not colinear with socket centerline 38 in the embodiment illustrated. In the embodiment illustrated in FIG. 4, socket centerline 38 is positioned above cup centerline 46 such that roller 66 will extend further above top 22 of cup 10. This is best seen in FIG. 6. In another embodiment, socket centerline 38 is coincident with cup centerline 46 such that roller 66 on axle 62 will be centrally disposed in cup 10 and extend equally through top 22 and bottom 24. This is best seen in FIGS. 14 and 15.

Figure 5:
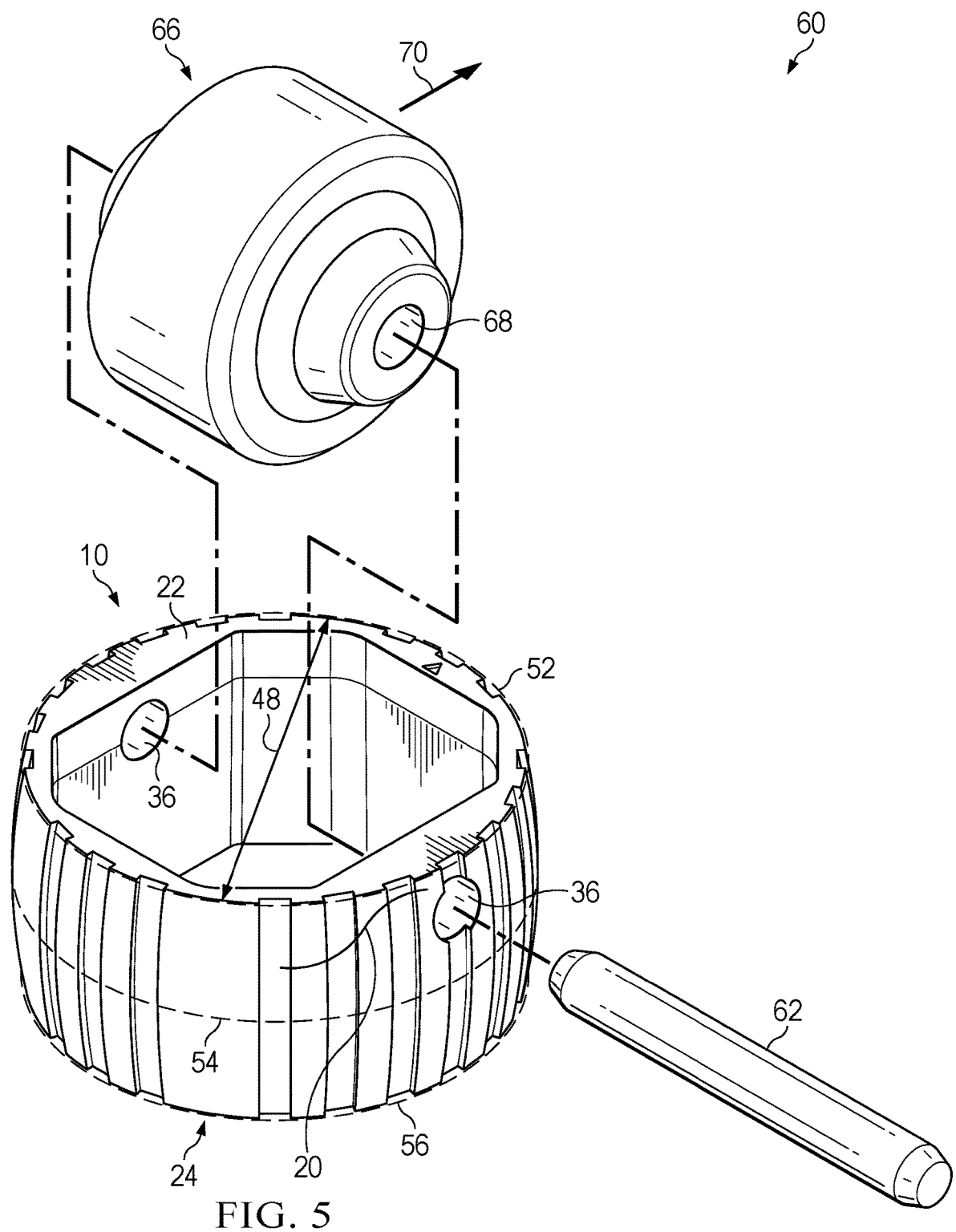
FIG. 5 is an isometric exploded view of a cup assembly in accordance with an embodiment of the disclosed invention.

FIG. 5 is an isometric exploded view of a cup assembly 60 in accordance with an embodiment of the disclosed invention. Axle 62 is positioned in sockets 36 of cup 10. Roller 66 has an axle port 68. Axle 62 is located inside axle port 68 of roller 66 to position roller 66 rotatably inside cup 10. As seen in FIG. 5, roller 66 has a direction 70 that is perpendicular to axle 62. Direction 70 is aligned with indicator 34 on cup 10.

As seen in FIG. 5, a top perimeter 52 is defined by the intersection of exterior 20 with top 22. A middle perimeter 54 is defined by the intersection of exterior 20 with midplane 40 (see FIG. 3). A bottom perimeter 56 is defined by the intersection of exterior 20 with bottom 24. The enlarged center of exterior 20 of cup 10 may also be spherical or spheroidal as illustrated, or other suitable geometry that renders middle perimeter 54 larger than top perimeter 52 or bottom perimeter 56.

Figure 15:
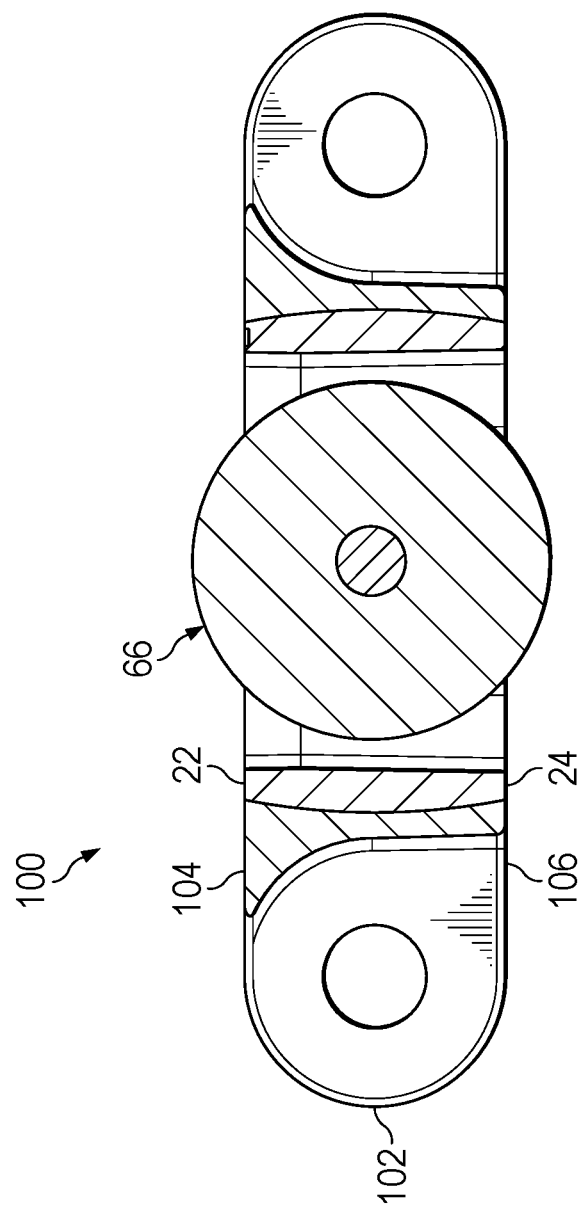
FIG. 15 is a cross sectional end view of the conveyor module of FIG. 14.

As can be seen by looking ahead to FIGS. 13 and 15, enlarged middle perimeter 54 secures cup 10 within conveyor module 100 and resists vertical displacement even in a high impact and high vibration environment. In one embodiment, top perimeter 52 is equal to bottom perimeter 56.

FIG. 6 is a side view of cup assembly 60 of FIG. 5. As assembled, the embodiment of FIGS. 1-5 illustrate roller 66 extending well above top 22 of cup 10.

Figure 7:
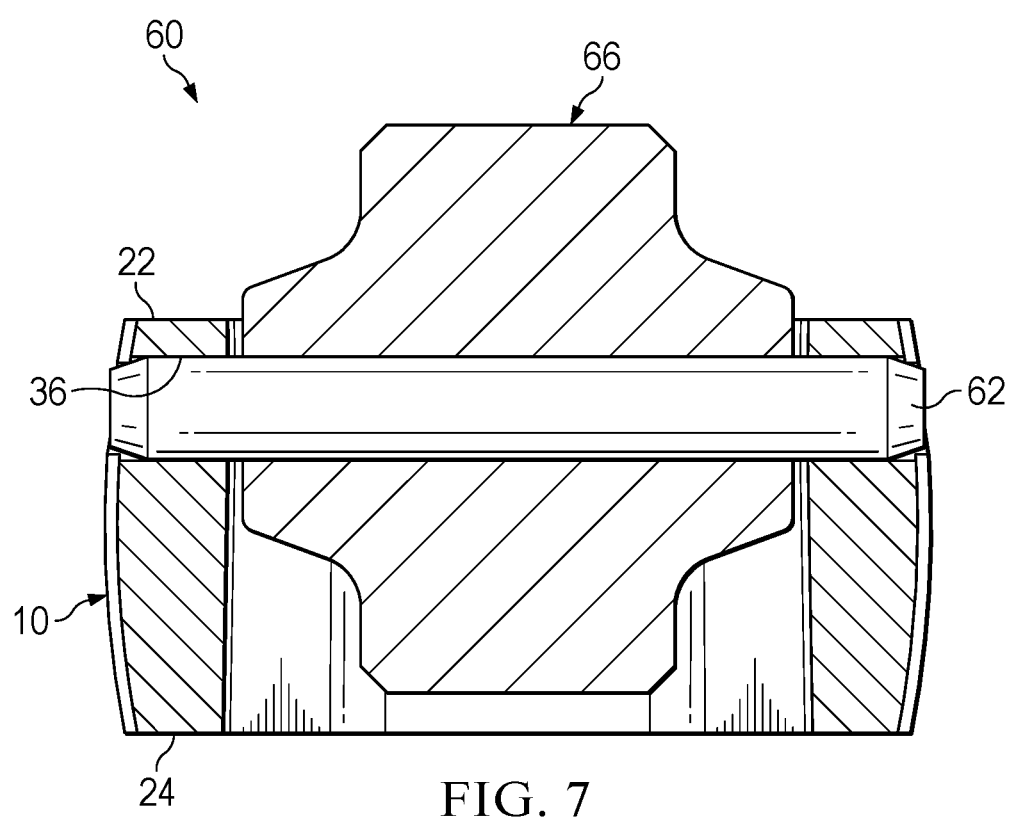
FIG. 7 is a cross-sectional side view of the cup assembly of FIGS. 5-6.

FIG. 7 is a cross-sectional side view of cup assembly 60 of FIGS. 5-6. As seen in FIG. 7, in this embodiment, roller 66 extends above top 22 of cup 10 but not below bottom 24 of cup 10. This is due to the positioning of socket centerline 38 above cup centerline 46 as is best seen in FIG. 4.

Figure 8:
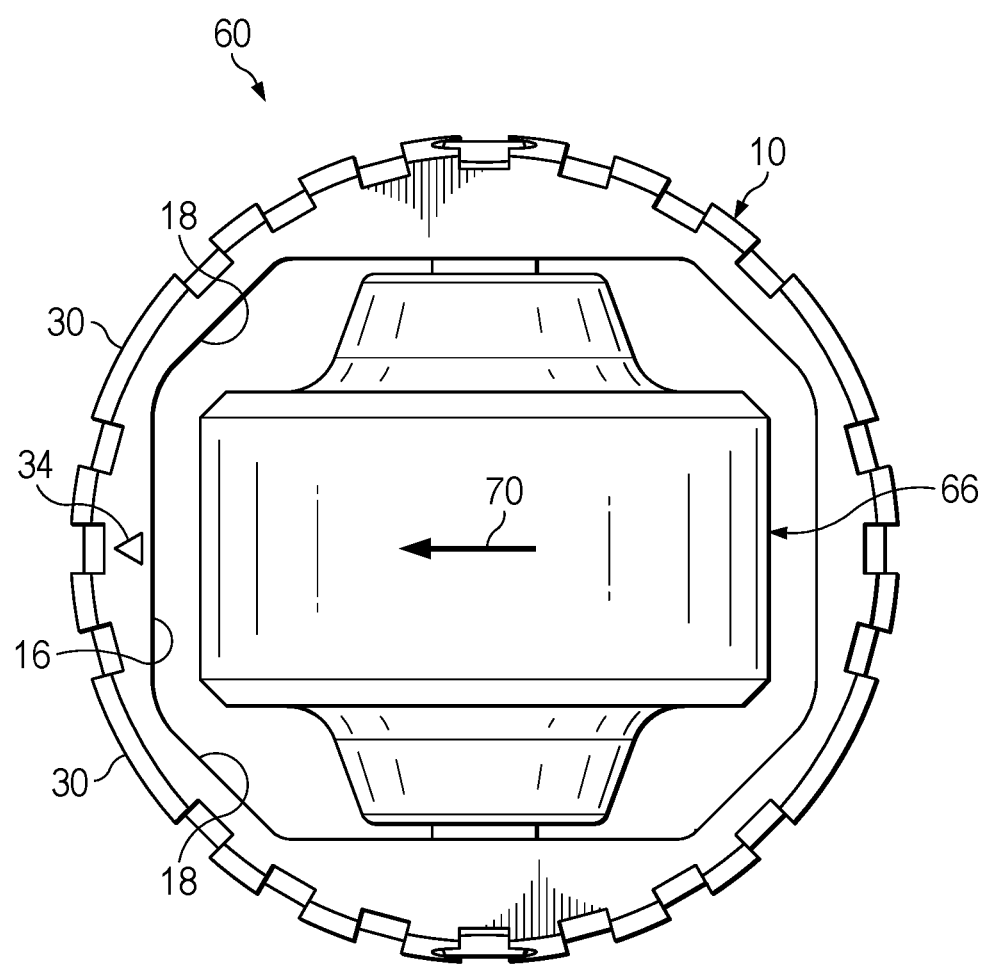
FIG. 8 is a top view of the cup assembly of FIGS. 5-7.

FIG. 8 is a top view of cup assembly 60 of FIGS. 5-7. As seen in FIG. 8, roller 66 direction 70 is aligned with indicator 34 on cup 10. As also seen in FIG. 8, panels 30 are located proximate to the intersection of path walls 16 and transitions 18. This location is coincident with the outer edges of roller 66. The purpose of the designed intersection of these geometries is to provide sufficient material thickness to cup 10 at the intersection of path walls 16 and transitions 18.

Figure 9:
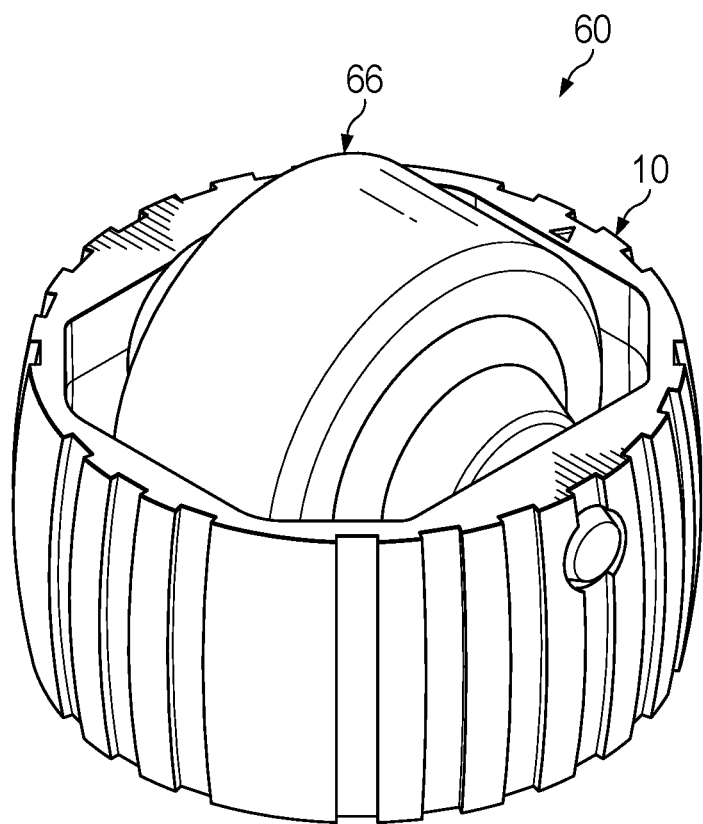
FIG. 9 is an isometric view of FIGS. 5-8.

FIG. 9 is an isometric view of the embodiments of cup assembly 60 illustrated in FIGS. 5-8. As illustrated in FIG. 9, cup assembly 60 is ready for placement in a molding assembly to have a conveyor module 100 formed around cup assembly 60. Unique to the present invention, the disclosed sequence of ribs 28 and panels 30 separated by reliefs 32 provides a structure to exterior 20 of cup 10 that prevents rotation when molded into conveyor module 100. Similarly, the enlarged center 42 of exterior 20 of cup 10 may be, for example, spherical or spheroidal, with cup diameter 44 larger than top diameter 48 or bottom diameter 50, providing a structure to exterior 20 of cup 10 that prevents vertical displacement of cup assembly 60 when molded into conveyor module 100. Designed in the manner disclosed, cup assembly 60 will become an integral and unmovable part of conveyor module 100.

Figure 10:
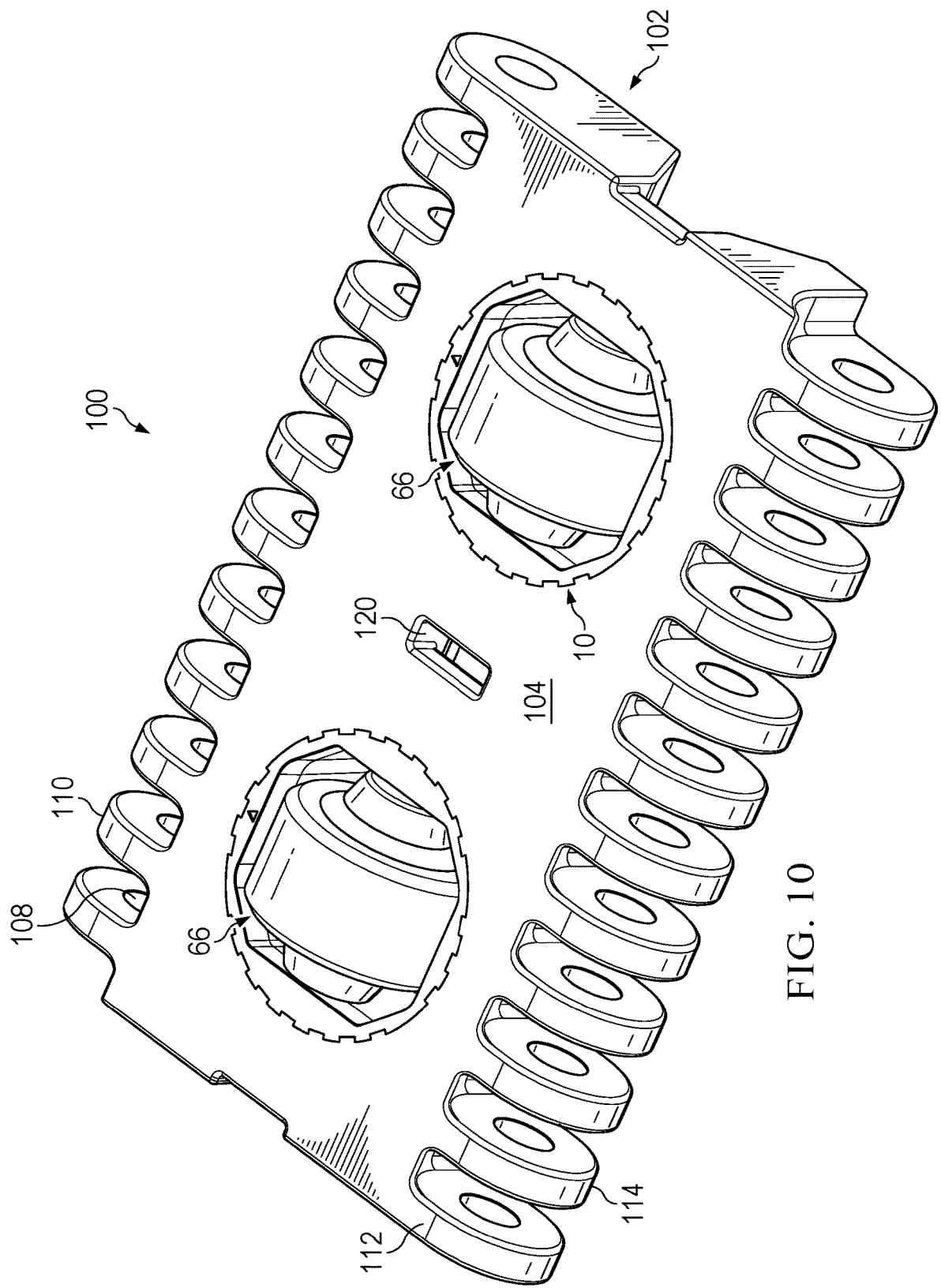
FIG. 10 is an isometric top view of an embodiment of a conveyor module of the disclosed invention, in which the rollers extend above the conveyor module.
Figure 11:
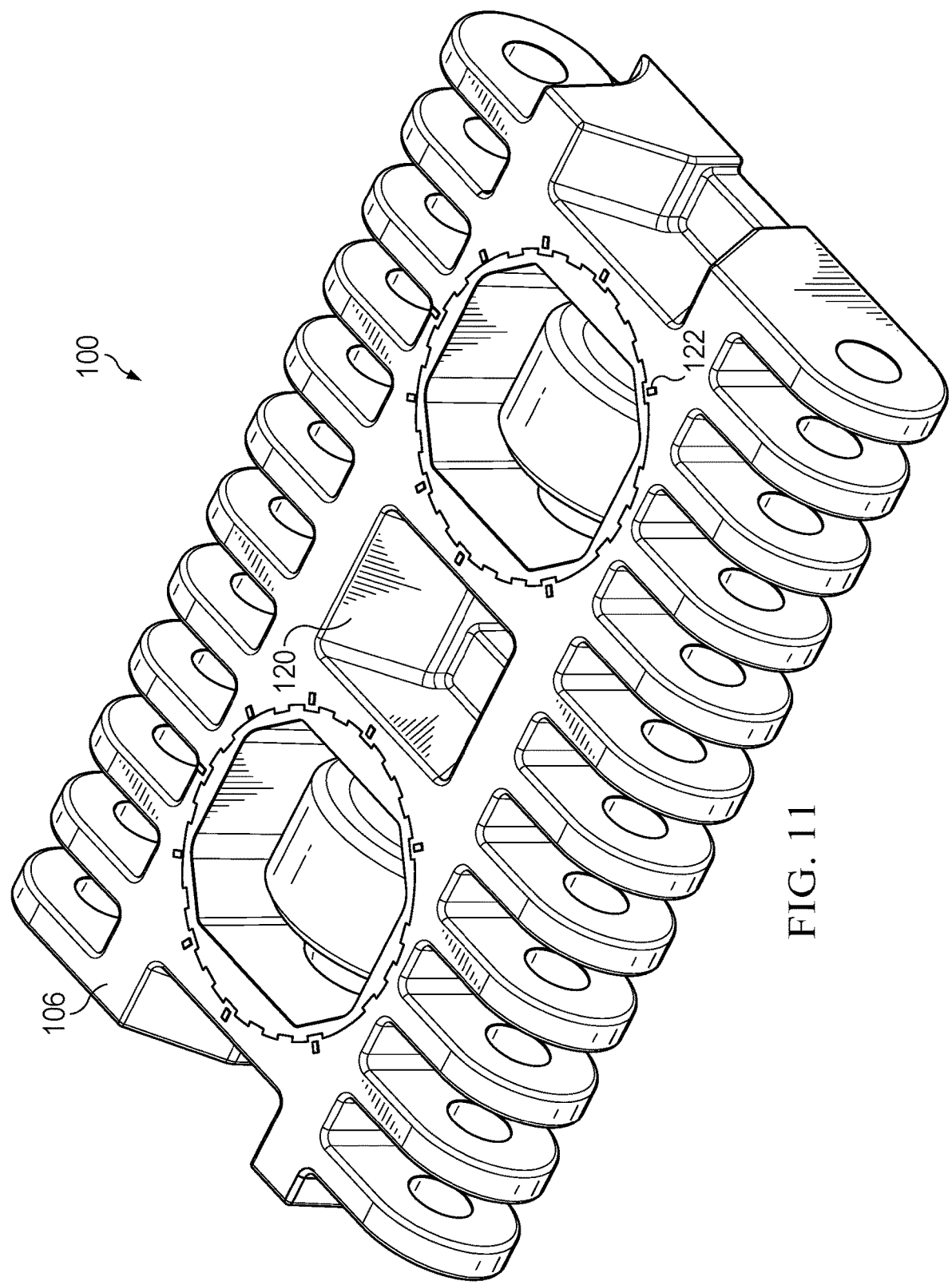
FIG. 11 is an isometric bottom view of the conveyor module of FIG. 10.

FIG. 10 is an isometric top view of an embodiment of conveyor module 100 of the disclosed invention, in which rollers 66 extend above, but not below, conveyor module 100. FIG. 11 is an isometric bottom view of conveyor module 100 of FIG. 10. First side linking members 110 and second side linking members 114 extend between a first end 108 and an opposite second end 112 of planar member 102.

Figure 19:
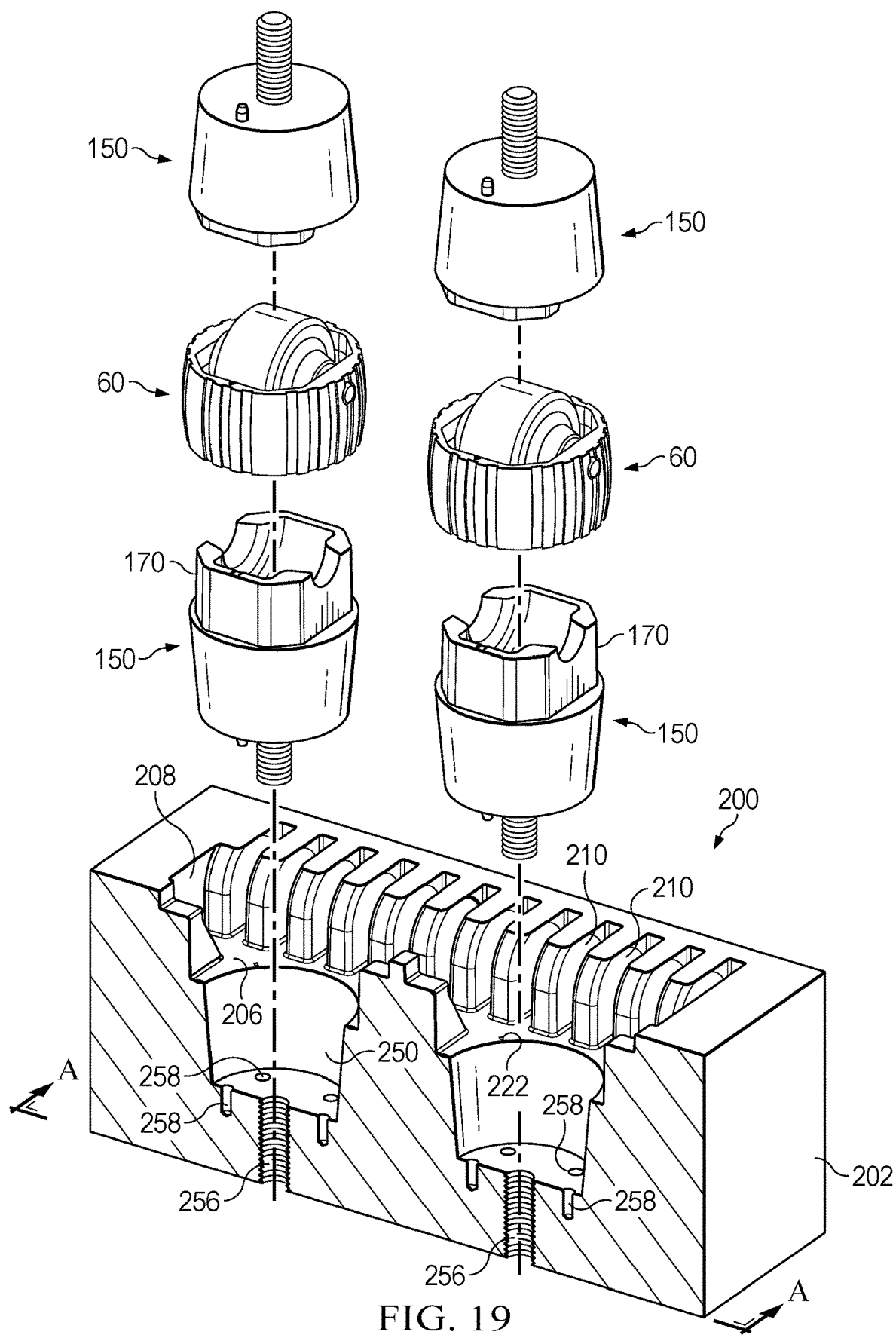
FIG. 19 is an isometric exploded view of the inserts and cup assemblies of FIGS. 16-18, and a sectioned view of a mold cavity for use in the manufacture of an embodiment of the conveyor module of the disclosed invention.

In one embodiment, as illustrated in FIG. 11, alignment indicia 122 may be provided on bottom surface 106 of conveyor module 100 for quick reference of alignment. Alignment indicia 122 are a result of cavity indicia indicated on first mold cavity 200, as best seen in FIG. 19. A drive socket 120 is provided on bottom surface 106 of conveyor module 100 for receiving a drive mechanism such as a toothed sprocket for advancing conveyor module 100 within a conveyor system.

Figure 12:
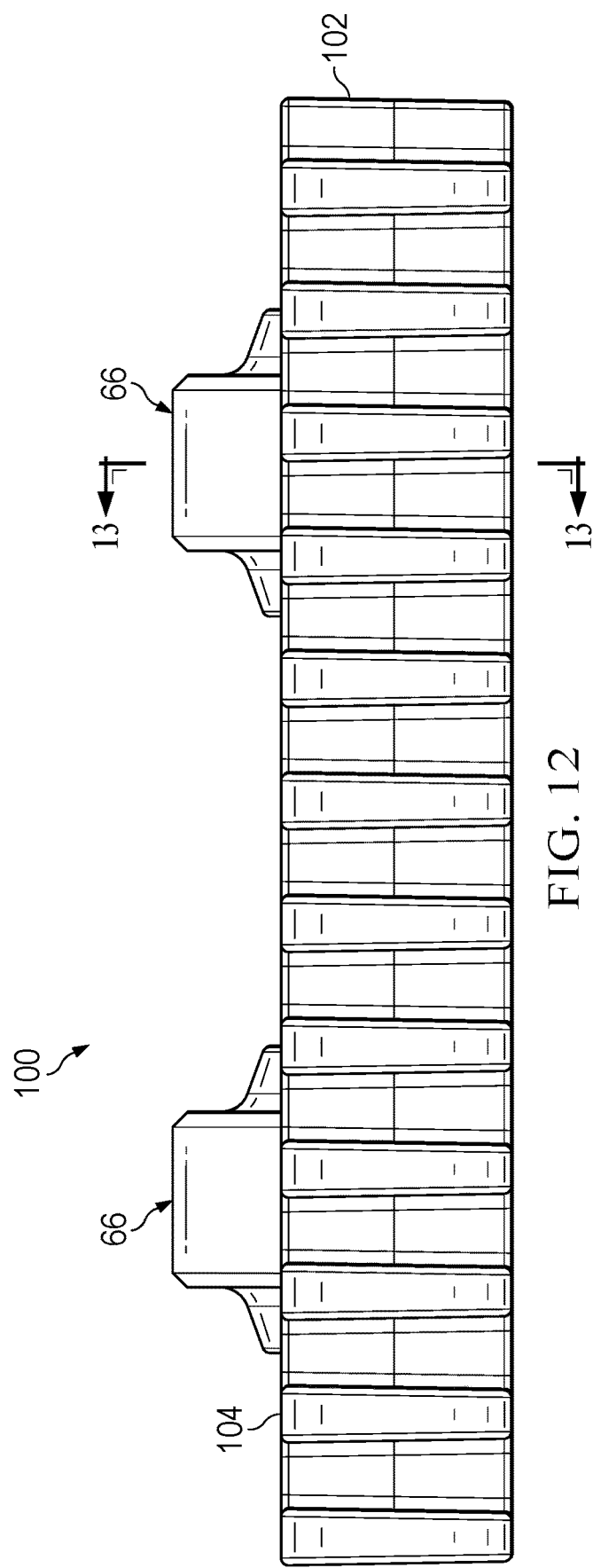
FIG. 12 is a side view of the conveyor module of FIGS. 10-11.

FIG. 12 is a side view of conveyor module 100 of FIGS. 10-11 illustrating how rollers 66 extend above, but not below, conveyor module 100. As described above and as best seen in FIG. 4, this embodiment was achieved by the location of socket centerline 38 above cup centerline 46.

FIG. 13 is a cross-sectional end view of the embodiment of conveyor module 100 of FIGS. 10-12. As seen in this view, top 22 of cup 10 is flush with top surface 104 of planar member 102, and bottom 24 of cup 10 is flush with bottom surface 106 of planar member 102. This represents a proper and full integration of cup assembly 60 into planar member 102 when planar member 102 is formed by injection molding.

As also seen in this view (and in FIG. 15), and unique to the present invention, the enlarged center of exterior 20 of cup 10, which may also be spherical or spheroidal, physically locks cup assembly 60 in place inside planar member 102 to prevent relative vertical displacement over time due to vibration and impact forces that may wear on the material bond between cup assembly 60 and planar member 102.

FIG. 14 is a side view of another embodiment of conveyor module 100 in accordance with the disclosed invention in which rollers 66 extend above and below planar member 102. This embodiment provides utility in a number of applications well-known to the conveyor industry.

FIG. 15 is a cross sectional end view of conveyor module 100 of FIG. 14. As seen in this view, top 22 of cup 10 is flush with top surface 104 of planar member 102 and bottom 24 of cup 10 is flush with bottom surface 106 of planar member 102. This represents a proper and full integration of cup assembly 60 into planar member 102 when planar member 102 is formed by injection molding.

As contrasted to the embodiment illustrated in FIG. 4 and FIGS. 10-13, the embodiment of FIGS. 14 and 15 is achieved by the location of socket centerline 38 at (or near) cup centerline 46 (best seen in FIG. 4), and thus at (or near) cup midplane 40 (best seen in FIG. 3). The relative protrusion of rollers 66 above top surface 104 and bottom surface 106 is determined by the offset of socket centerline 38 from cup centerline 46 and/or cup midplane 40.

Figure 16:
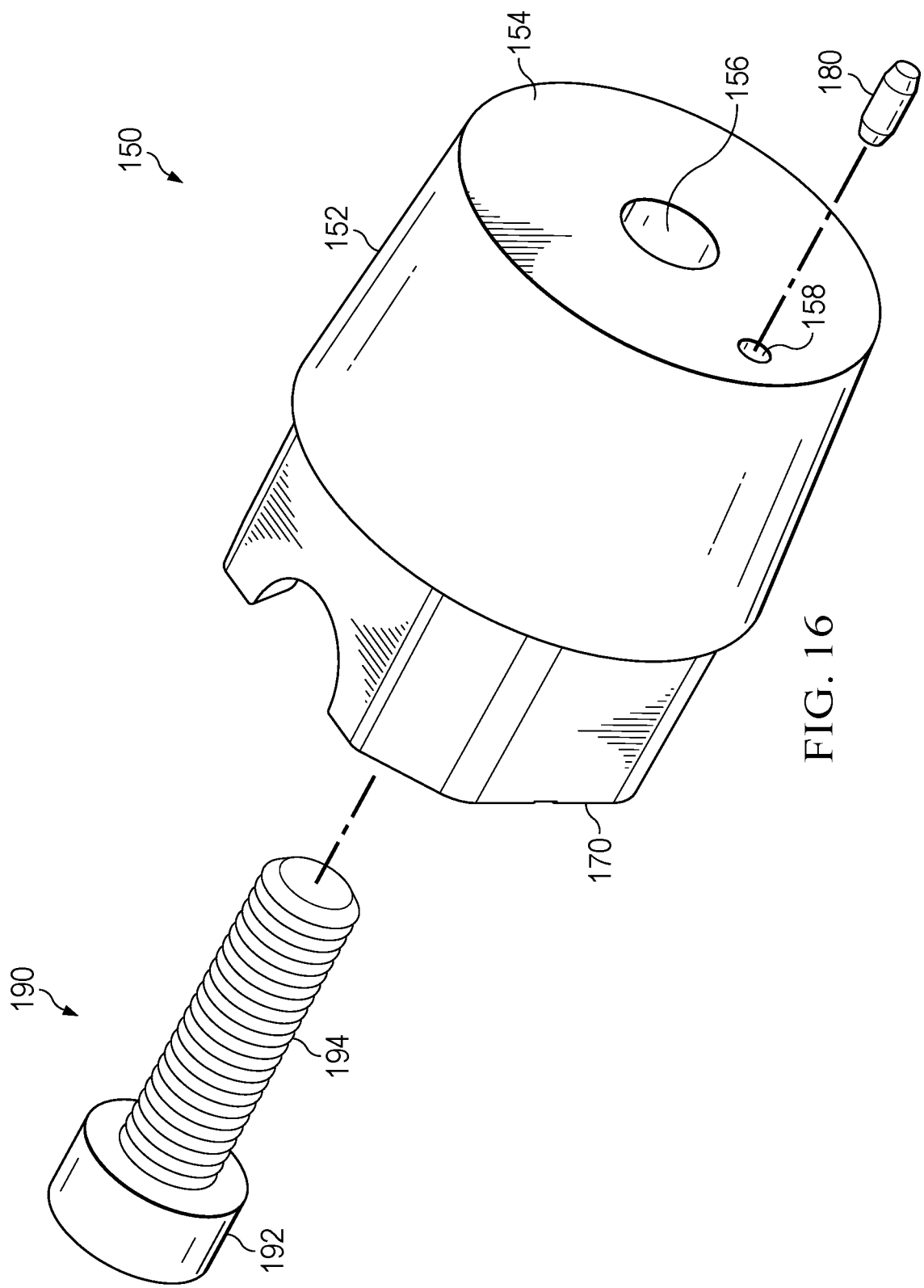
FIG. 16 is an isometric exploded view of an insert for use in the manufacture of an embodiment of the conveyor module of the disclosed invention.

Attention is now turned to the special requirements of manufacturing the embodiments of the conveyor module 100 disclosed in FIGS. 1-15. FIG. 16 is an isometric exploded view of an insert 150 for use in the manufacture of an embodiment of conveyor module 100. Insert 150 has an insert body 152, from which a core 170 extends. Insert body 152 has a base 154 and a center port 156 that extends through insert 150. A pin port 158 is located on base 154 for receiving a locator pin 180.

Center port 156 is designed to receive a threaded fastener 190 for connecting insert 150 to a mold cavity 200 (see FIG. 19). Fastener 190 has a fastener head 192 and threaded portion 194.

Figure 17:
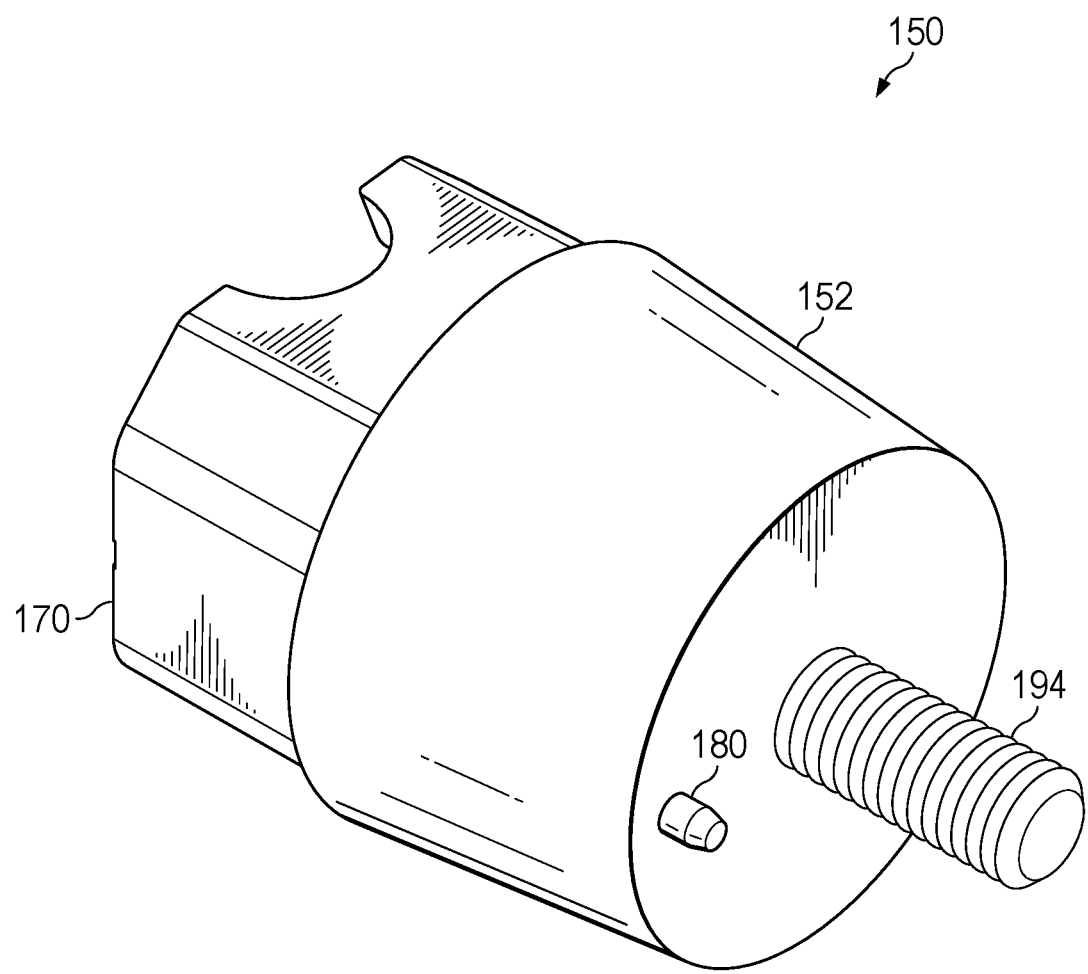
FIG. 17 is an assembled isometric view of the embodiment of the insert disclosed in FIG. 16, shown generally from the insert body side of the insert.

FIG. 17 is an assembled isometric view of the embodiment of insert 150 disclosed in FIG. 16, shown generally from the insert body 152 side of insert 150. Fastener 190 has been inserted into insert 150 and threaded portion 194 extends through center port 156. Locator pin 180 is shown inserted in pin port 158 on base 154.

Figure 18:
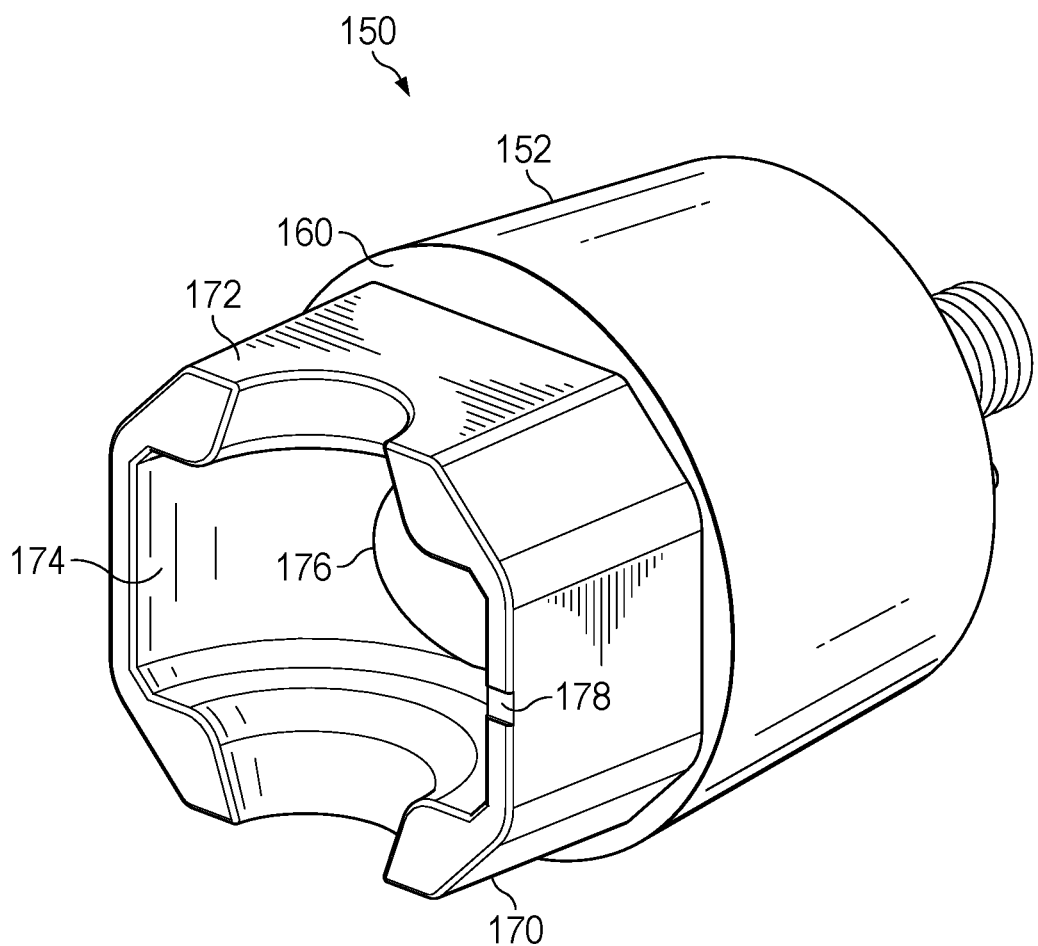
FIG. 18 is an isometric view of the embodiment of the insert disclosed in FIG. 17, shown generally from the core side of the insert.

FIG. 18 is an isometric view of the embodiment of insert 150 of FIG. 17, shown now from the core 170 side of insert 150. Core 170 has a core exterior 172. Insert 150 has a landing 160 on core 170 side of insert body 152. Landing 160 is critical for providing a seal against cup assembly 60 when assembled against mold cavity 200.

Figure 20:
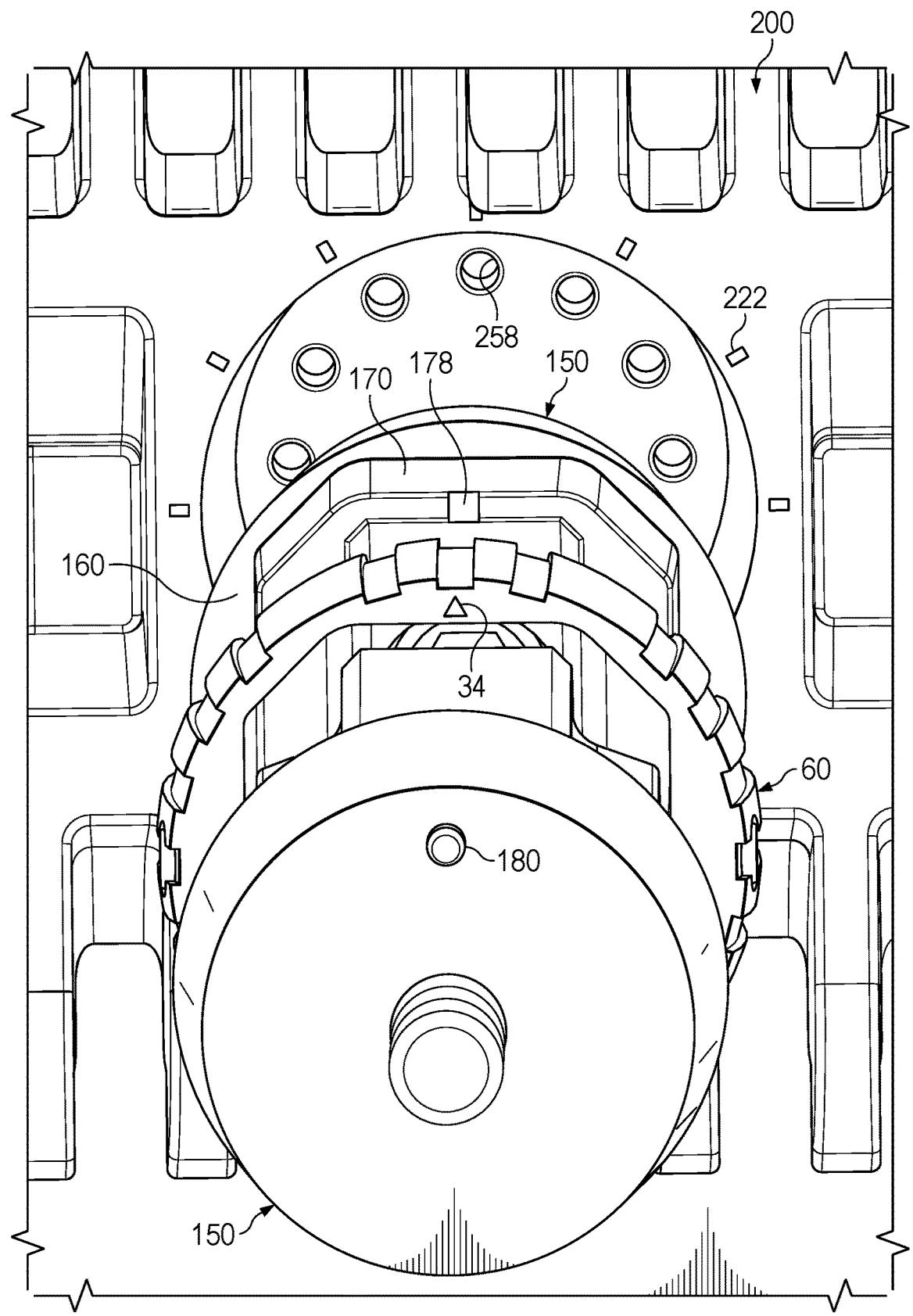
FIG. 20 is an isometric exploded view of the inserts and a cup assembly and a sectioned view of a mold-half of FIG. 19, illustrating the alignment of the elements.

Core 170 has an interior 174 for receiving roller 66 of cup assembly 60 in complementary fit that will prevent injected polymer molding material from invading the space between roller 66 and cup 10 of cup assembly 60. A core portal 176 receives fastener head 192 of fastener 190. As best seen in FIG. 20, a core indicia 178 may be provided for alignment of insert 150 during assembly of cup assembly 60, inserts 150 and mold cavities 200.

FIG. 19 is an isometric exploded view of inserts 150, cup assemblies 60, and a sectioned view of a mold cavity 200 for use in the manufacture of an embodiment of conveyor module 100 of the disclosed invention.

As seen in FIG. 19, cup assembly 60 is positioned between an upper insert 150 and a lower insert 150. Each of upper insert 150 and lower insert 150 will be connected to a mold cavity 200 by threaded fasteners 190. Cup assembly 60 is secured between inserts 150 and positioned between opposing first (or bottom) mold cavity 200 and a second (or top) mold cavity 300 (not shown).

Mold cavity 200 has a body 202. Mold cavity 200 is for forming the bottom half of planar member 102. It has a recessed bottom surface 206 that will form planar member 102 bottom surface 106 (see FIG. 11). An opposing mold cavity 300 (not shown) has a recessed top surface 304 (not shown) that will form planar member 102 top surface 104 (see FIG. 10).

Cavity links 210 are provided for forming first side and second side linking members 110 and 114 when injected with liquid polymer (see FIG. 10). A cavity first end 208 forms first end 108 of planar member 102 when injected with liquid polymer. Cavity indicia 222 may optionally be provided on recessed bottom surface 206 for confirmation of alignment with inserts 150 and cup assembly 60.

Receptacles 250 are recessed in bottom surface 206 of mold cavity 200 for receiving inserts 150. Cavity fastener ports 256 extend through the bottom of receptacles 250 for receiving fasteners 190 for securing inserts 150 to mold cavity 200. A cavity pin port 258 receives locator pin 180 on inserts 150 to provide proper rotational positioning of inserts 150. Fastener ports 256 receive fasteners 190 to secure inserts 150 in place in receptacles 250.

To prevent injected polymer molding material from invading the space between roller 66 and cup 10 of cup assembly 60, core 170 locates and aligns cup assembly 60 in relation to insert 150. This permits sealed contact between cup 10 top 22 (FIG. 3) and an upper insert 150 landing 160 (FIG. 18) and between cup 10 bottom 24 (FIG. 3) and a lower insert 150 landing 160 (FIG. 18). To further prevent injected polymer molding material from invading the space between roller 66 and cup 10 of cup assembly 60, sockets 36 are dimensioned to receive axle 62 in interference fit.

It will be immediately appreciated that the length of core 170 depends on the embodiment of cup assembly 60 being incorporated into planar member 102. For example, insert 150 above cup assembly 60 and insert 150 below cup assembly 60 may be identical when building conveyor module 100 of FIGS. 14 and 15. However, referring to FIG. 4, where socket centerline 38 is located above cup centerline 46 when building conveyor module 100 of FIGS. 12 and 13, insert 150 above cup assembly 60 and insert 150 below cup assembly 60 must be different to accommodate the difference in engagement of roller 66 inside cup 10 in those embodiments. In particular, as seen in FIG. 19, core 170 of insert 150 above cup assembly 60 will be shorter, and core 170 of insert 150 below cup assembly 60 will be longer. This offset accommodates the offset between cup centerline 46 and socket centerline 38 and thus the position of axle 62 in that embodiment.

FIG. 20 is an isometric exploded view of insert 150, cup assembly 60 and mold cavity 200 aligned for assembly. In this view, it is seen that locator pin 180 of insert 150 is aligned with indicator 34 of cup assembly 60, and with the proper cavity pin port 258 of mold cavity 200. As seen in this view, there are multiple options for selecting a desired direction of roller 66. As with the protrusion of roller 66, certain conveyor applications are known to benefit for rollers 66 being disposed at angles to the direction of travel of the conveyor module 100.

Advantages of the various embodiments of the present invention are that it is durable. Another advantage of the present invention is that it is inexpensive to manufacture. Another advantage of the present invention is that it does not require a post molding assembly. Other advantages of the various embodiments of the present invention are that they do not require post molding, welding, gluing or other methods of affixing component parts to a molded conveyor module. Another advantage of the present invention is that it provides a homogeneous top surface 104 and bottom surface 106 in relation to cup 10 that do not permit entrapment of contaminants.

Another advantage of the present invention is that it provides a unified cup assembly 60 and conveyor module 100 combination that is resistant to vertical dislodgement in a high-impact environment. Another advantage of the present invention is that it provides for a unified cup assembly 60 and conveyor module 100 combination that is resistant to angular dislodgement in a high-impact environment due to the rib 28, panel 30 and relief 32 relationship to conveyor module 100 on molding. Another advantage of the present invention is that it provides a means of presetting the angular orientation of cup assembly 60 in conveyor module 100 with visual alignment indicators, such as 34 and 178, and the physical alignment structure of locater pin 180 and cavity pin port 258.

Another advantage of the present invention is that it provides a strengthened cup 10 structure that incorporates panels 30 at the junction of path walls 16 and transitions 18 that allow cup 10 to withstand the high pressures of the molding process without distortion and the high vibration of operation without breaking. Another advantage of the present invention is that it provides a unique method of manufacturing that encloses a complete cup assembly 60 with a roller 66 on an axle 62 within the molded conveyor module 100. Other advantages of the various embodiments of the present invention are that it is easy to clean.

It will be readily apparent to those skilled in the art that the general principles defined herein may be applied to other embodiments and applications without departing from the spirit and scope of the present invention. For example, it is not necessary that cup 10 have the shape of a segmented spheroidal or segmented sphere. Other center-large geometries can be presented to resist vertical separation from conveyor module 100.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A conveyor belt module, comprising:
   a planar member having a first edge, an opposing second edge, a top surface, and a bottom surface;
   a plurality of first links located along the first edge;

a plurality of second links located along the second edge, and offset from the first links;
the module injection molded around a cup assembly, the cup assembly comprising:
a cup comprising:
an exterior;
a top positioned flush with the top surface of the module;
a bottom positioned flush with the bottom surface of the module;
a hollow interior; and,
a pair of opposing sockets;
an axle extending between the sockets; and,
a roller mounted on the axle; and,
wherein the roller extends beyond the top surface or the bottom surface of the module.

2. The conveyor belt module of claim 1, further comprising:
the roller extends above the top surface of the module and below the bottom surface of the module.

3. The conveyor belt module of claim 1, the cup further comprising:
the top having a top perimeter;
the bottom having a bottom perimeter;
a cup centerline extending halfway between the top and the bottom of the cup;
a middle perimeter surrounding the exterior of the cup at its centerline; and,
the top perimeter and the bottom perimeter being shorter than the middle perimeter.

4. The conveyor belt module of claim 1, the cup further comprising:
a pair of parallel opposing axle walls located on the interior of the cup; and,
the opposing sockets being located in the opposing axle walls.

5. The conveyor belt module of claim 3, the cup further comprising:
a plurality of ribs formed on the exterior of the cup; and,
a relief adjacent to each rib.

6. The conveyor belt module of claim 5, the cup further comprising:
the ribs extending between the cup top and the cup bottom.

7. The conveyor belt module of claim 5, the cup further comprising:
the ribs surrounding the cup exterior;
each rib formed at an arc angle a about the exterior; and,
the ribs separated by reliefs formed at arc angle a about the exterior.

8. The conveyor belt module of claim 7, the cup further comprising:
the arc angle a being fifteen-degrees (15°).

9. The conveyor belt module of claim 1, the cup further comprising:
a plurality of ribs, each rib formed at an arc angle a about the cup exterior;
a relief adjacent to each rib;
a panel positioned between the reliefs; and,
the panel formed at an arc angle b about the exterior of the cup that is wider than arc angle a.

10. The conveyor belt module of claim 9, the cup exterior further comprising:
a plurality of ribs and four panels.

11. The conveyor belt module of claim 10, the cup exterior further comprising:

a first pair of panels separated by alternating ribs and reliefs to form an arc angle of ninety degrees (90°);
a second pair of panels separated by alternating ribs and reliefs to form an arc angle of ninety degrees (90°); and,
the second pair of panels disposed opposite the first pair of panels.

12. The conveyor belt module of claim 1, the cup further comprising:
the cup having a hollow interior comprising:
a pair of opposing axle walls;
a pair of opposing path walls located in perpendicular relation to the axle walls; and,
transitions connecting the axle walls to the path walls.

13. The conveyor belt module of claim 12, the cup exterior further comprising:
a plurality of ribs;
a relief adjacent to each of the ribs;
a panel positioned between two reliefs and proximate to the junction of the path walls and transitions.

14. The conveyor belt module of claim 1, the cup further comprising:
an exterior having the shape of a segmented spheroidal.

15. The conveyor belt module of claim 14, wherein the spheroidal is an oblate spheroidal.

16. The conveyor belt module of claim 1, the cup further comprising:
a cup midplane parallel to, and halfway between, the top and the bottom of the cup;
a cup diameter at the cup midplane representing an exterior diameter of the cup;
a top diameter representing an exterior diameter of the top of the cup;
a bottom diameter representing an exterior diameter of the bottom of the cup;
the top diameter and the bottom diameter being equal to each other; and,
the top diameter and the bottom diameter being less than the cup diameter.

17. The conveyor belt module of claim 16, the cup further comprising:
the sockets, axle, and roller being centered on the cup diameter; and,
the roller extends above the top surface of the module and below the bottom surface of the module.

18. The conveyor belt module of claim 16, the cup further comprising:
the sockets, axle, and roller being centered above the cup diameter; and,
the roller extends above the top surface of the module.

19. The conveyor belt module of claim 1, the cup further comprising:
a cup midplane parallel to, and halfway between, the top and the bottom of the cup; and,
the sockets, axle, and roller being located at the cup midplane.

20. The conveyor belt module of claim 1, the cup further comprising:
a cup midplane parallel to, and halfway between, the top and the bottom of the cup; and,
the sockets, axle, and roller being located above the cup midplane.

21. The conveyor belt module of claim 1, further comprising:
a module direction being perpendicular to the first edge of the planar member; and,
a roller direction being perpendicular to the axle.

22. The conveyor belt module of claim 1, further comprising:
  the roller having an axle port;
  the axle extending through the axle port;
  the axle positioned in the sockets in interference fit; and,
  the axle positioned in the axle ports in non-interference fit.

23. A method of manufacturing a conveyor belt module comprising the processes of:
  molding a cup comprising:
    a hollow interior;
    a pair of opposing sockets in the interior; and,
    a flat top surface and a flat bottom surface in a plane parallel to the top surface;
  placing a roller with a hollow center axis in the interior of the cup;
  locating an axle in the sockets of the cup and in the central axis of the roller to create a cup assembly;
  providing a first mold having a first receptacle;
  providing a first insert comprising:
    a fill structure that extends in complementary fit into a gap between the roller and the interior of the cup; and,
    a base, locatable against the top of the cup assembly and insertable into the first receptacle;
  positioning the first insert in the first receptacle of the first mold and connecting both to an injection molding machine;
  providing a second mold having a second receptacle;
  providing a second insert further comprising:
    a fill structure that extends in complementary fit into a gap between the roller and the interior of the cup; and,
    a base, locatable against the bottom of the cup assembly and insertable into the second receptacle;
  positioning the second insert in the second receptacle of the second mold and connecting both to an injection molding machine;
  positioning the cup assembly over the fill structure of the first insert;
  pressing the second mold against the first mold to form a module void between the first mold and the second mold;
  infusing the module void with a desired polymer;
  curing the polymer to form a conveyor module section with the cup assembly in the desired location and orientation;
  separating the second mold from the first mold; and,
  removing the module and cup assembly from the molding machine.

24. The method of claim 23 further comprising:
  inserting a locating pin that extends from the base of the first insert into a cavity pin port in the receptacle of the first mold to align the cup assembly in relation to the first and second molds.

* * * * *